June 3, 1952  I. G. ORELLANA  2,598,825
X-RAY TESTING APPARATUS
Filed Sept. 26, 1949  2 SHEETS—SHEET 1

INVENTOR.
ILDEFONSO G. ORELLANA.
BY
Richey Watts
ATTORNEYS.

June 3, 1952  I. G. ORELLANA  2,598,825

X-RAY TESTING APPARATUS

Filed Sept. 26, 1949  2 SHEETS—SHEET 2

INVENTOR.
ILDEFONSO G. ORELLANA.
BY
Richey Watts
ATTORNEYS.

Patented June 3, 1952

2,598,825

UNITED STATES PATENT OFFICE 2,598,825

X-RAY TESTING APPARATUS

Ildefonso G. Orellana, Mayfield Heights, Ohio, assignor to The Republic Steel Corporation, Cleveland, Ohio, a corporation of New Jersey Application September 26, 1949, Serial No. 117,899

5 Claims. (Cl. 250—83.3)

My invention relates to thickness gauges in which the thickness of material is determined by measuring its transmission of radiant energy, and more particularly to the calibration of such gauges. The invention has been incorporated in a gauge for continuously measuring the thickness of hot strip in a rolling mill, the gauge determining the thickness of the moving strip by measuring the transmission of X-rays through the strip. The measuring device operates on a comparison principle, comparing the transmission of the web being measured with that of one of a set of test samples mounted in the measuring device.

When this device is adjusted or set up for strip of a particular thickness, it is necessary for accurate measurement to adjust the instrument to the proper reading while passing the measuring X-ray beam through a test piece or calibration sample of steel of the exact thickness desired. It may also be desirable to check the calibration of the device from time to time by means of a test piece.

Heretofore, these test pieces have been loose, and the operator of the machine would take the desired test piece from a box or other place of storage and insert it in the test beam for calibration purposes. This procedure has been disadvantageous in that test pieces became disarranged, lost, or damaged, and because it subjected the operator of the machine to harmful radiation.

This invention is embodied in a permanent setup in which the set of test pieces are mounted on a conveyor so that any one of the test pieces can be quickly and easily moved into position for calibrating the test device. The test pieces are enclosed and protected by a housing, and may be moved into position by the machine operator from a point well beyond the range of radiation. While the preferred embodiment of the invention as described herein relates to a measuring device for hot steel strip employing X-rays, it will be apparent that the principles of the invention are applicable to calibration of analogous devices measuring webs of different character and employing radiation other than X-rays.

The nature of the invention and the objects thereof will be more clearly apparent to those skilled in the art from the appended description of the preferred embodiment of the invention and the accompanying drawings in which.

Figure 1:
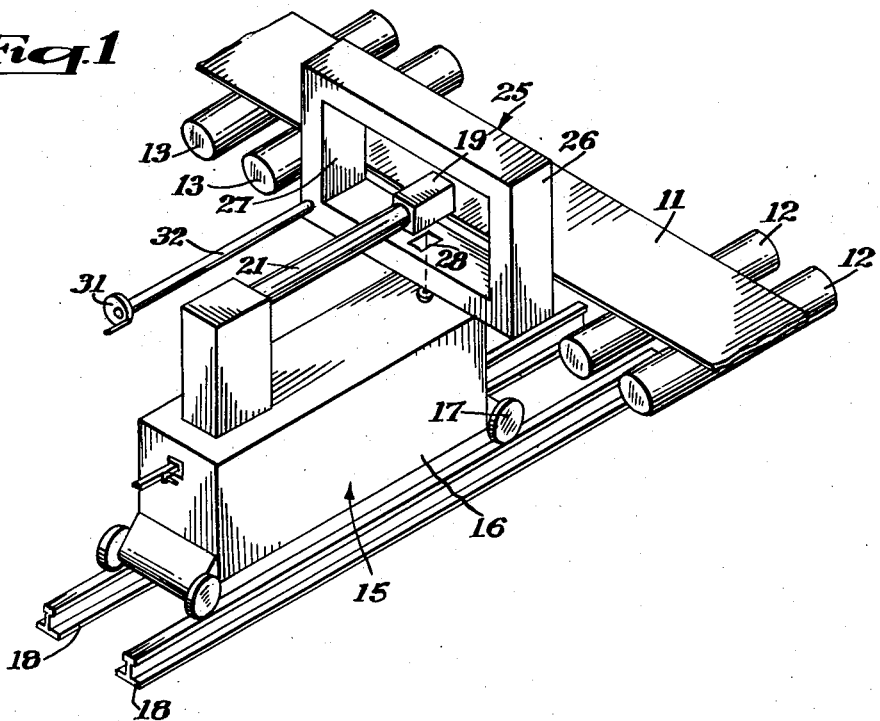
Fig. 1 is an axonometric view, of a somewhat schematic nature, of the invention applied to a strip mill.

Referring to Fig. 1, which shows the general layout of the invention, the web or strip 11 is illustrated passing over the runout table of a hot strip or sheet mill, the conveyor rolls being shown schematically at 12. Before passing over the runout table, the strip passes between mill rolls, only the lower rolls of which are indicated at 13, in which the gauge or thickness of the strip is reduced. The thickness gauge 15 is of known type and comprises a carriage 16 mounted on wheels 17 running on rails 18 laid below and transversely of the path of the strip. Means for generating X-radiation are located in the carriage so as to project a beam of radiation upwardly to a head 19 mounted on an arm 21 extending from the carriage. The thickness gauge is shown in its calibration position in which the beam is out of register with the strip 11. For the measuring operation it is moved forward so that the beam passes through the strip near the center thereof.

The thickness gauge includes apparatus by which the transmission of X-rays by the strip 11 is compared to that of one of a set of standards contained in the gauge. The gauge as such is known to those skilled in the art, and the details of the gauge are not material to the present invention, or necessary to an understanding thereof, and therefore will be omitted in the interest of conciseness.

Figure 2:
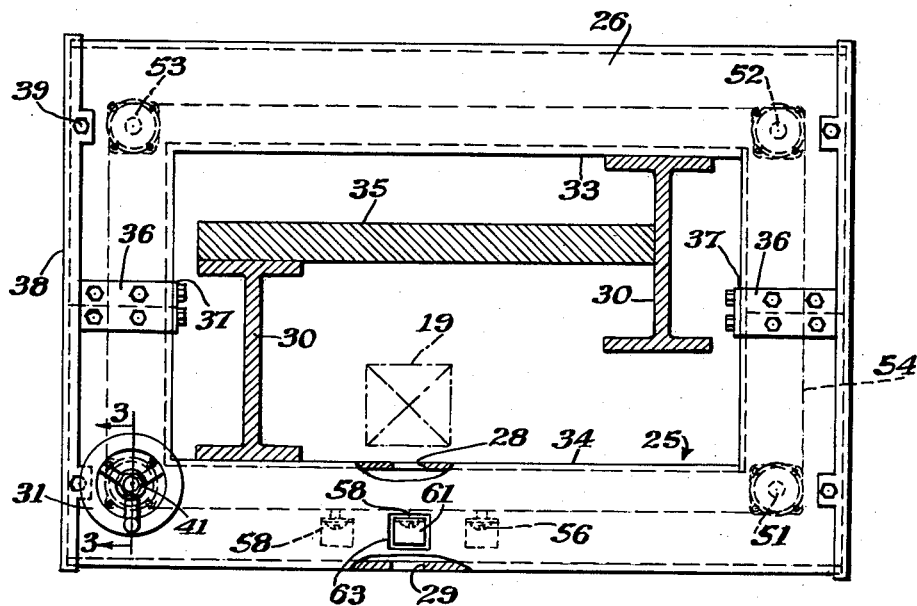
Fig. 2 is an elevation view of the test piece selector.

The test piece selector or calibrating device 25 of the present invention comprises a closed rectangular housing 26 of rectangular cross section. This housing is of annular form with a central opening 27 through which the head 19 and arm 21 of the measuring device may be traversed, and the lower horizontal arm of the calibrating device is located alongside the web 11 so that the measuring beam of the gauge 15 may be directed through this arm of the housing. The housing 26 is mounted on permanent supports, such as I-beams 30 (Fig. 2) extending across the runout table, which support a guard 35. The housing is formed with windows 28 in the upper surface of the lower leg and 29 in the lower surface thereof, through which the beam passes when the instrument is in calibrating position.

A plurality of test samples, corresponding to the gauges of metal which may be rolled by the mill, are mounted in the housing 26 so that any one of them may be moved into registry with the X-ray beam. This movement is effected by a hand wheel 31, which may be coupled to the device by an extension shaft 32 so that the test piece selector may be operated from a position remote from the radiation.

The preferred structure of the test piece selector may now be described in some detail. The housing 26 of the selector is formed of an upper section 33 and a lower section 34 for purposes of assembly and mounting, each section comprising a welded assembly of steel plates forming a horizontal box and vertical channels at each end open at the outer face. The sections are joined by plates 36 on the side faces and 37 on the inner faces fixed to the channel members by machine screws. The open outer ends of the housing 25 are closed by covers 38 held in place by machine screws 39 passing through lugs in the covers and into the sections 33 and 34.

Figure 3:
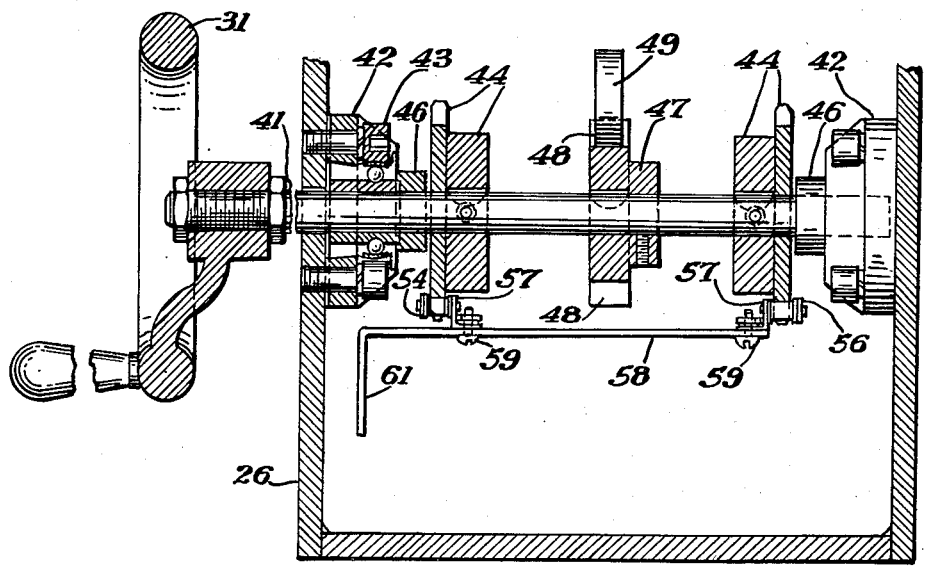
Fig. 3 is a partial sectional view on the plane indicated in Fig. 2.

A shaft is journalled at each corner of the housing, on each of which is mounted two sprockets which support parallel endless chains on which the test pieces are mounted. The shaft 41 (Fig. 3) which drives the chain extends through the housing. The hand wheel 31 may be secured thereon by lock nuts as shown, or an extension shaft as illustrated in Fig. 1 may be fitted between the shaft 41 and the hand wheel 31. The shaft 41 is mounted in standard commercial bearing cartridges 42 secured to the inner surface of the front and rear plates of the housing by machine screws 43. Standard chain sprockets 44 are keyed to the shaft adjacent the ends thereof and spacing sleeves 46 are mounted on the shaft between the sprockets and the bearing members. A detent wheel 47 formed with two notches 48 is also keyed to the shaft 41. The detent wheel 48 is engaged by a spring-urged roller 49 so as to hold the shaft impositively in two positions 180° apart.

The remaining shafts 51, 52, and 53, which are idler shafts, are similar in structure and mounting to the shaft 41, except that they are not provided with the extension through the housing for drive purposes and are not fitted with detent mechanism. Two roller chains 54 and 56, which may be of conventional type, are threaded over the sprockets 44, thus forming an endless conveyor operable by the hand wheel 31. The chains are provided with attachment brackets 57 of a commercially available type spaced on the chain at intervals corresponding to one-half turn of the sprockets 44. A test piece 58 is fixed to each pair of brackets 57 by bolts 59. These test pieces, as stated, are of various thicknesses corresponding to the desired gauges of steel to be rolled. Each test piece is formed with a flange or tab 61 on which the gauge or thickness of the test piece is engraved or otherwise marked. The lower horizontal box member 34 is cut away to provide aligned windows 28 and 29 in its upper and lower surfaces, respectively, which register with the beam of the thickness gauge when it is in its calibrating position. A window 63 is cut in the outer face of the member 34, aligned with the windows 28 and 29, so that the tab 61 of the test piece in position is visible to the operator of the machine.

Figure 4:
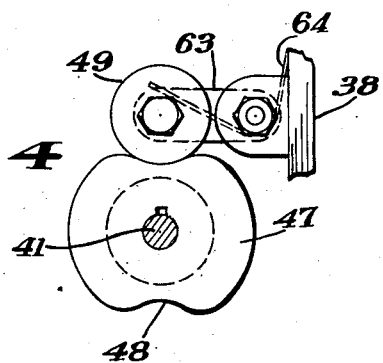
Fig. 4 is a detail.

As shown in Fig. 4, the detent roller 49 is supported by an arm 63 pivoted on the cover 38 and urged downwardly by a spring 64.

The operation of the device will, no doubt, be apparent but may be described briefly. To calibrate the thickness gauge, it is rolled outwardly on the rails so that the measuring beam passes through the windows 28 and 29 and the shaft 41 is turned to bring the appropriate test piece into the beam. The thickness gauge is then calibrated in the usual manner and is rolled back into position to measure the thickness of the web 11.

In gauging operations on a strip mill where the X-ray gauge detector head is mounted in a fixed position to measure gauge along a single line on the strip, the test piece selector can be mounted at the same location so that the gauge calibration and strip gauging can be accomplished without withdrawing the X-ray gauge from the strip pass line. To calibrate the X-ray gauge the desired test piece is moved into the X-ray beam. To operate the gauge on the strip being rolled the test piece is moved away from the X-ray beam and a blank spot on the chain carrying the test pieces is selected so that the X-ray beam passes only through the strip.

It will be apparent to those skilled in the art that the principles of the invention may be embodied in various structures and may be adapted to installations of various types. The description herein of the preferred embodiment of the invention is not to be construed as limiting the scope thereof which is defined by the appended claims.

I claim:

1. A thickness measuring apparatus for a moving web comprising, in combination, a device for determining the thickness of the web by measuring the transmission characteristics of the web comprising a single X-radiation generator and a radiation detector disposed on opposite sides of the web, movable between a first position in register with the web and a second position out of register therewith, and a test piece selector for moving any one of a set of test pieces of various known thicknesses into register with the device in its second position, the test piece selector comprising a conveyor, a plurality of test pieces mounted thereon, and means for operating the conveyor to align any of the test pieces with the device, the test pieces normally intercepting the radiation when the device is in the second position, and whereby the selector may be utilized for checking the measuring device over a wide range of thickness variations.

2. A thickness measuring apparatus for a moving web of metal comprising, in combination, a device for determining the thickness of the web by measuring the transmission characteristics of the web to radiation comprising a single X-radiation generator and a radiation detector disposed on opposite sides of the web, movable between a first position in register with the web and a second position out of register therewith, and a test piece selector for moving any one of a set of test pieces of various known thicknesses of metal into register with the device in its second position, the test piece selector comprising an endless conveyor, a plurality of test pieces of sheet metal mounted thereon, and means for operating the conveyor to align any of the test pieces with the device, the test pieces normally intercepting the radiation when the device is in the second position, and whereby the selector may be utilized for checking the measuring device over a wide range of thickness variations.

3. A thickness measuring apparatus for a moving web of metal comprising, in combination, means for feeding the web; a device for determining the thickness of the web comprising two parts, a part normally extending on each side of the web, the device including means for measuring radiant energy transmitted from one part to the other through the web including an X-radiation generator mounted in one part and a radiation detector mounted in the remaining part, the device being mounted for traversing movement to a position out of registry with the web; and a calibrating means for the device comprising a generally rectangular housing with an opening therethrough for traversal by one of the said parts, windows being formed in the walls of the housing for registry with the measuring device when it is out of registry with the web, a pair of parallel endless chains traversing the housing, means for moving the chains, a plurality of pieces of sheet metal of known thicknesses mounted on the chain in spaced relation and movable thereby into registry with the said windows for disposition in the path of the radiation from the generator, the pieces intercepting the radiation from the same source as the web, a sight opening being provided in the housing for identification of the piece in registry, and detent means for locating the pieces in proper registry.

4. A thickness measuring apparatus for a moving web of metal comprising, in combination, means for feeding the web; a device for determining the thickness of the web comprising two parts, a part normally extending on each side of the web, the device including means for measuring radiant energy transmitted from one part to the other through the web including an X-radiation generator mounted in one part and a radiation detector mounted in the remaining part, the device being mounted for traversing movement to a position out of registry with the web; and a calibrating means for the device comprising a frame-shaped housing with an opening therethrough for traversal by one of the said parts, windows being formed in the walls of the housing for registry with the measuring device when it is out of registry with the web, an endless conveyor traversing the housing, means for moving the conveyor, and a plurality of pieces of sheet metal of known thicknesses on the conveyor in spaced relation and movable thereby into registry with the said windows, the test pieces being disposed in the path of radiation from the generator in place of the web.

5. A thickness measuring apparatus for a moving web of material comprising, in combination, a device for determining the thickness of the web comprising movable means for measuring radiant energy transmitted through the web including an X-radiation generator disposed on one side of the web and a radiation detector disposed on the other side of the web, the device being movable into and out of engagement with the web; and a calibrating means for the device located adjacent the path of the web comprising a hollow annular housing, windows being formed in the walls of the housing for registry with the measuring means in one position thereof, a conveyor traversing the housing, a plurality of pieces of sheet material of known thicknesses on the conveyor in spaced relation, and means for moving the conveyor to shift any one of said pieces into registry with the said windows for disposition in the radiation from the generator, the calibrating means being operably associated with the measuring device only when said device is out of register with the web and the pieces operatively replacing the web.

ILDEFONSO G. ORELLANA.

REFERENCES CITED

The following references are of record in the file of this patent:

UNITED STATES PATENTS

| Number | Name | Date |
| --- | --- | --- |
| 2,094,103 | Horsley et al. | Sept. 28, 1937 |
| 2,264,725 | Shoupp et al. | Dec. 2, 1941 |
| 2,370,163 | Hare | Feb. 27, 1945 |

OTHER REFERENCES

"X-Ray Thickness Gauge for Cold Rolled Strip Steel," Lundahl, Electrical Engineering, April 1948, pp. 349–353.